United States Patent
Kantorovich et al.

(10) Patent No.: US 11,861,752 B2
(45) Date of Patent: Jan. 2, 2024

(54) METHOD OF SCORING A MOTION OF A USER AND SYSTEM THEREOF

(71) Applicant: AGT International GmbH, Zurich (CH)

(72) Inventors: Aleksandr Kantorovich, Darmstadt (DE); Olivier Boisard, Darmstadt (DE)

(73) Assignee: AGT INTERNATIONAL GMBH, Zurich (CH)

( * ) Notice: Subject to any disclaimer, the term of this patent is extended or adjusted under 35 U.S.C. 154(b) by 326 days.

(21) Appl. No.: 16/840,999

(22) Filed: Apr. 6, 2020

(65) Prior Publication Data

US 2021/0308551 A1    Oct. 7, 2021

(51) Int. Cl.
| | | |
|---|---|---|
| *G06Q 50/20* | (2012.01) | |
| *A63B 71/06* | (2006.01) | |
| *A63B 24/00* | (2006.01) | |
| *G06V 10/764* | (2022.01) | |
| *G06V 40/20* | (2022.01) | |
| *A63B 102/32* | (2015.01) | |

(52) U.S. Cl.
CPC ......... *G06Q 50/20* (2013.01); *A63B 24/0006* (2013.01); *A63B 71/0669* (2013.01); *G06V 10/764* (2022.01); *G06V 40/23* (2022.01); *A63B 2024/0012* (2013.01); *A63B 2071/065* (2013.01); *A63B 2071/0625* (2013.01); *A63B 2071/0694* (2013.01); *A63B 2102/32* (2015.10); *A63B 2220/05* (2013.01); *A63B 2220/803* (2013.01); *A63B 2220/806* (2013.01); *A63B 2220/836* (2013.01); *A63B 2244/102* (2013.01)

(58) Field of Classification Search
CPC ............ A63B 71/0669; A63B 24/0006; A63B 2024/0012; A63B 2071/0625; A63B 2071/065; A63B 2071/0694; A63B 2102/32; A63B 2220/05; A63B 2220/803; A63B 2220/806; A63B 2220/836; A63B 2244/102; G06K 9/6274; G06K 9/6282; G06K 9/6269; G06Q 10/0639; G06Q 50/20; G06V 40/23; G09B 19/0038

See application file for complete search history.

(56) References Cited

U.S. PATENT DOCUMENTS

| | | | |
|---|---|---|---|
| 6,032,530 A | 5/2000 | Hock | |
| 6,533,675 B2 | 3/2003 | Funk | |
| 6,821,211 B2 | 11/2004 | Otten et al. | |
| 6,959,259 B2 | 10/2005 | Vock et al. | |

(Continued)

OTHER PUBLICATIONS

Groenier, Marleen, Frank Halfwerk, and Erik Groot Jebbink. "Motion tracking to support surgical skill feedback and evaluation." 24th Annual Meeting of the Society in Europe for Simulation Applied to Medicine, SESAM 2018: Enlightening Medical Education for 24 years. 2018. Abstract.

(Continued)

*Primary Examiner* — Jeffrey S Vanderveen
(74) *Attorney, Agent, or Firm* — Browdy and Neimark, PLLC

(57) ABSTRACT

The presently disclosed subject matter includes a computerized method and system for providing a total score on a motion of a user. More specifically, the proposed technique obtain motion data, process the motion data and provide a total quality score for the motion of the user with respect to a designated target motion.

14 Claims, 5 Drawing Sheets

(56) References Cited

U.S. PATENT DOCUMENTS

| | | |
|---|---|---|
| 9,414,784 B1 | 8/2016 | Berme et al. |
| 2012/0214594 A1 | 8/2012 | Kirovski et al. |
| 2015/0105882 A1 | 4/2015 | Clark et al. |
| 2015/0110354 A1 | 4/2015 | Snook et al. |
| 2016/0252326 A1 | 9/2016 | Jones |
| 2016/0263458 A1 | 9/2016 | Mather et al. |
| 2017/0005958 A1 | 1/2017 | Frenkel et al. |
| 2017/0035328 A1 | 2/2017 | Yuen et al. |
| 2017/0308812 A1 | 10/2017 | Kaisser |
| 2019/0224528 A1* | 7/2019 | Omid-Zohoor ...... A61B 5/0024 |
| 2021/0060382 A1* | 3/2021 | Douglas ............. A63B 24/0075 |
| 2021/0308551 A1* | 10/2021 | Kantorovich ........ G06V 10/764 |

OTHER PUBLICATIONS

Kwon, Doo Young, and Markus Gross. "Combining body sensors and visual sensors for motion training." Proceedings of the 2005 ACM SIGCHI International Conference on Advances in computer entertainment technology. 2005.

* cited by examiner

400 providing a feedback 360 manipulating a subscore, giving rise to manipulated subscore 410 calculating a resulting manipulated total quality score based on the manipulated subscore 420 selecting a resulting manipulated total quality score that meets the improvement criterion 430 providing the feedback 440

*Fig 4*

METHOD OF SCORING A MOTION OF A USER AND SYSTEM THEREOF

TECHNICAL FIELD

The presently disclosed subject matter relates to monitoring a motion of a user and, more particularly, to scoring and providing feedback on a motion of a user.

BACKGROUND

In a computerized process of training a user to perform a certain motion, the user performs the motion, performance of the motion is tracked, e.g. by a camera or sensors attached to the user, processed, and then feedback of the performed motion is provided to the user. In some known solutions, the system provides feedback to the user by reporting a set of measurements related to the motion performed by the user. Such systems include for example, a computerized tennis game where the user uses a racket with sensors that evaluate the swing speed, and presents the user with the data on the swing. By utilizing a camera capturing the ball, and a processor that evaluates the position of the ball, the system can show the user the exact spot where the racket made contact with the ball, allowing the user to understand what to work on and how to improve his motions. However, interpreting the measurements and deciding how exactly the motion execution should be improved is left for the user.

However, it is desired to provide the user with a more accurate evaluation of his motions, and also to provide a guiding feedback on the motion that was performed.

GENERAL DESCRIPTION

According to one aspect of the presently disclosed subject matter there is provided a computerized method for scoring a motion of a user, comprising, by a processor and memory circuitry:
    obtaining motion data, the motion data being indicative of a motion of a user;
    obtaining data indicative of a designated target motion;
    processing the motion data for obtaining at least one motion class, and determining a confidence score to each motion class respectively, wherein at least one motion class is associated with the designated target motion;
    processing the obtained motion data for extracting at least one characteristic measurement;
    obtaining at least one reference characteristic measurement, that relates to the designated target motion, wherein at least one of the reference characteristic measurements corresponds to at least one of the extracted characteristic measurements, respectively;
    calculating at least one characteristic score, based on one of the extracted characteristic measurements and the corresponding obtained reference characteristic measurement;
    so as to obtain a set of subscores that is composed of at least the determined at least one confidence score and the determined at least one characteristic score; and
    providing a total quality score for the motion of the user with respect to designated target motion, based on the set of subscores, wherein the total quality score is indicative of correctness of the motion of the user with respect to the designated target motion.

In addition to the above features, the method according to this aspect of the presently disclosed subject matter can optionally comprise one or more of features (i) to (iv) below, in any technically possible combination or permutation:

i. the computerized method further comprises:
    providing feedback with respect to a selected subscore from among the set of subscores;
    ii. wherein the subscore is selected, including:
    in response to manipulating a subscore, a resulting manipulated total quality score meets an improvement criterion compared to resulting manipulated total quality scores that are obtained in response to manipulating other non-selected subscores from the set of subscores;
    iii. wherein, the total quality score constitutes a non-manipulated total quality score, and wherein providing the feedback includes performing with respect to each of the at least two subscores of the set of subscores:
        a) manipulating one of the subscores, giving rise to a manipulated subscore;
        b) calculating a resulting manipulated total quality score with respect to the target motion of the user, based on the manipulated subscore instead of the non-manipulated subscore;
    selecting a resulting manipulated total quality score that meets the improvement criterion; and
    providing the feedback with respect to the target motion of the user that pertains to the subscore that is associated with the selected resulting manipulated total quality score;
    iv. wherein the improvement criterion includes the resulting manipulated total quality score being the highest score;
    v. wherein the manipulating one of the subscores includes modifying the subscore to a maximal possible score;
    vi. wherein the obtaining motion data comprises at least receiving motion data from one or more sensors operatively connected to the user.

According to another aspect of the presently disclosed subject matter there is provided a system for providing a total score on a motion of a user, comprising:
    one or more sensors operatively connected to the user;
    a processing and memory circuitry (PMC) operatively connected to the one or more sensors, wherein:
    the one or more sensors are configured to sense motion data, the motion data being indicative of a motion of a user;
    the PMC is configured to:
        obtain motion data, the motion data is indicative of a motion of a user;
        obtain data indicative of a designated target motion;
        process the motion data for obtaining at least one motion class, and determining a confidence score to each motion class respectively, wherein at least one motion class is associated with the designated target motion;
        process the obtained motion data for extracting at least one characteristic measurement;
        obtain at least one reference characteristic measurement, that relates to the designated target motion, wherein at least one of the reference characteristic measurements corresponds to at least one of the extracted characteristic measurements, respectively;
        calculate at least one characteristic score, based on one of the extracted characteristic measurements and the corresponding obtained reference characteristic measurement;
        so as to obtain a set of subscores that is composed of at least the determined at least one confidence score and the determined at least one characteristic scores; and
        provide a total quality score for the motion of the user with respect to the designated target motion, based on the set of subscores, wherein the total quality score is indicative of correctness of the motion of the user with respect to the designated target motion.

According to another aspect of the presently disclosed subject matter there is provided a non-transitory computer readable storage medium tangibly embodying a program of instructions that, when executed by a computer, cause the computer to perform a method for scoring a motion of a user, the method comprising:

obtaining motion data, the motion data being indicative of a motion of a user;

obtaining data indicative of a designated target motion;

processing the motion data for obtaining at least one motion class, and determining a confidence score for each motion class respectively, wherein at least one motion class is associated with the designated target motion;

processing the obtained motion data for extracting at least one characteristic measurement;

obtaining at least one reference characteristic measurement, that relates to the designated target motion, wherein at least one of the reference characteristic measurements corresponds to at least one of the extracted characteristic measurements, respectively;

calculating at least one characteristic score, each based on one of the extracted characteristic measurements and the corresponding obtained reference characteristic measurement;

so as to obtain a set of subscores that is composed of at least the determined at least one confidence score and the determined at least one characteristic scores; and providing a total quality score for the motion of the user with respect to the designated target motion, based on the set of subscores, wherein the total quality score is indicative of correctness of the motion of the user with respect to the designated target motion.

The system and the non-transitory computer readable storage media disclosed herein according to various aspects, can optionally further comprise one or more of features (i) to (iv) listed above, mutatis mutandis, in any technically possible combination or permutation.

BRIEF DESCRIPTION OF THE DRAWINGS

In order to understand the invention and to see how it can be carried out in practice, embodiments will be described, by way of non-limiting examples, with reference to the accompanying drawings, in which:

FIG. 4 illustrates a flowchart of operations carried out while providing feedback in accordance with certain embodiments of the presently disclosed subject matter.

DETAILED DESCRIPTION

Figure 1:
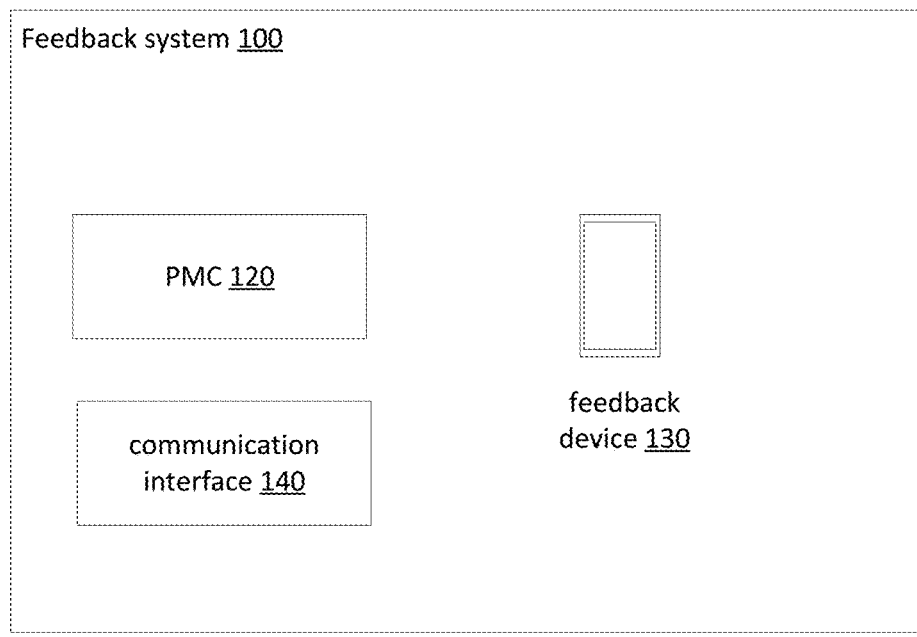
FIG. 1 shows a high level illustration of a feedback environment including feedback system 100, in accordance with certain embodiments of the presently disclosed subject matter.
Figure 1:
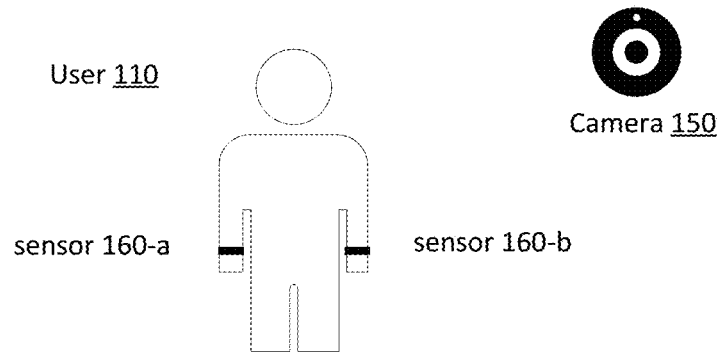

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "providing", "obtaining", "determining", "manipulating", "calculating", "comparing", "evaluating", "selecting", "modifying", "extracting", "generating", "identifying" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the processor and memory circuitry (PMC) 120 disclosed in the present application.

The terms "non-transitory memory" and "non-transitory storage medium" used herein should be expansively construed to cover any volatile or non-volatile computer memory suitable to the presently disclosed subject matter.

The operations in accordance with the teachings herein may be performed by a computer specially constructed for the desired purposes or by a general-purpose computer specially configured for the desired purpose by a computer program stored in a non-transitory computer-readable storage medium.

In known methods of providing feedback to users on a motion, the user performs the motion, his performance of the motion is tracked by sensors, processed, and then feedback of the performed motion is provided to the user. In some known solutions, the system provides feedback to the user by reporting a set of measurements related to the motion performed by the user. Consider an example of evaluating a certain type of a punch in a sport field, and evaluating some measurements of the motion, such as speed and force. Known systems may provide feedback on the speed of the motion by presenting the speed that was measured by the sensors. The system may also compare the motion performed by the user to a "perfect template" and provide the user with feedback based on the comparison. However, these known systems generate feedback by comparing the measurements to the measurements produced by a template motion. This approach often fails to account for multiple variations of the motion that are considered correct. Moreover, obtaining a perfect template motion is also often practically challenging. It is therefore advantageous to consider multiple variations of the motion in terms of measurements of that motion and to accurately reflect acceptable variation of the motion by collecting and processing representative set of example motions performed by skilled subjects instead of relying on a single template motion or rule-based heuristics. For example, when considering the speed of a performed motion of a user, it is advantageous to consider several speed measurements, which may be acceptable as correct performance of that type of punch. Comparing to a set of measurements rather than to a "perfect template" of a motion avoids the need to create a perfect template.

It is also advantageous to identify specific aspects or characteristics of a given motion execution that require improvement, e.g. speed or force of a motion, to provide a focused feedback, e.g. specific instructions or guidance of how to achieve improvement of one or more aspects of the motion, and prioritize the feedback to provide the one feedback with highest potential impact on the performance first.

Bearing this in mind, attention is drawn to FIG. 1 illustrating a high level illustration of a feedback environment including a user 110, one or more sensors 160 that are operatively connected to the user 110, a camera 150, and a feedback system 100 for providing a total score on a motion of a user in accordance with certain embodiments of the presently disclosed subject matter. Feedback system 100 is operatively connected to sensors 160 and camera 150.

Assume for example that user 110 wishes to perform a specific motion, for example, a punch. The user can also be interested in a specific punch type (referred to occasionally as a designated target motion) such as a jab, cross, hook or uppercut. One or more sensors 160 are operatively connected to the user 110 and are configured to sense motion data indicative of a motion of the user 110. For example, each of sensors 160-a and 160-b can be IMUs mounted on the wrist of the user 110. If the user 110 wishes to perform a target motion of a landed hook, IMUs sensors 160 sense motion data performed by the user 110. In some examples, sensors 160 include other type of sensors, such as a pressure mat (not shown) or camera 150. The other types of sensors are configured to capture motion data. For example, camera 150 is configured to capture a video of user 110 while performing the motion.

Feedback system 100, that is operatively connected to sensors 160, includes processing and memory circuitry (PMC) 120, communication interface 140 and a feedback device 130 configured to provide feedback to the user 110, e.g. a cell phone including a microphone and a display. Once the user 110 has performed a motion, sensors 160 sense motion data. Optionally, camera 150 is configured to sense motion data. PMC 120 is then configured to obtain the sensed motion data from sensors 160 and camera 150, e.g. by receiving such data from communication interface 140 communicating with the sensors 160 and camera 150. PMC 120 is configured to process the obtained motion data and to provide a score to the motion performed by the user 110 with respect to a designated target motion. For example, the designated target motion can be selected by the user before or after performing the motion. If the target motion is a landed hook, PMC 120 is configured to provide a score on the motion performed by the user 110 with respect to the landed hook. In some examples, PMC 120 is configured to provide feedback to the user 110 on how to improve his motion to perform the landed hook in a more correct and accurate manner. Such feedback can be provided to the user by feedback device 130, e.g. by displaying feedback on the display, or by providing audio feedback to the user 110.

Figure 2:
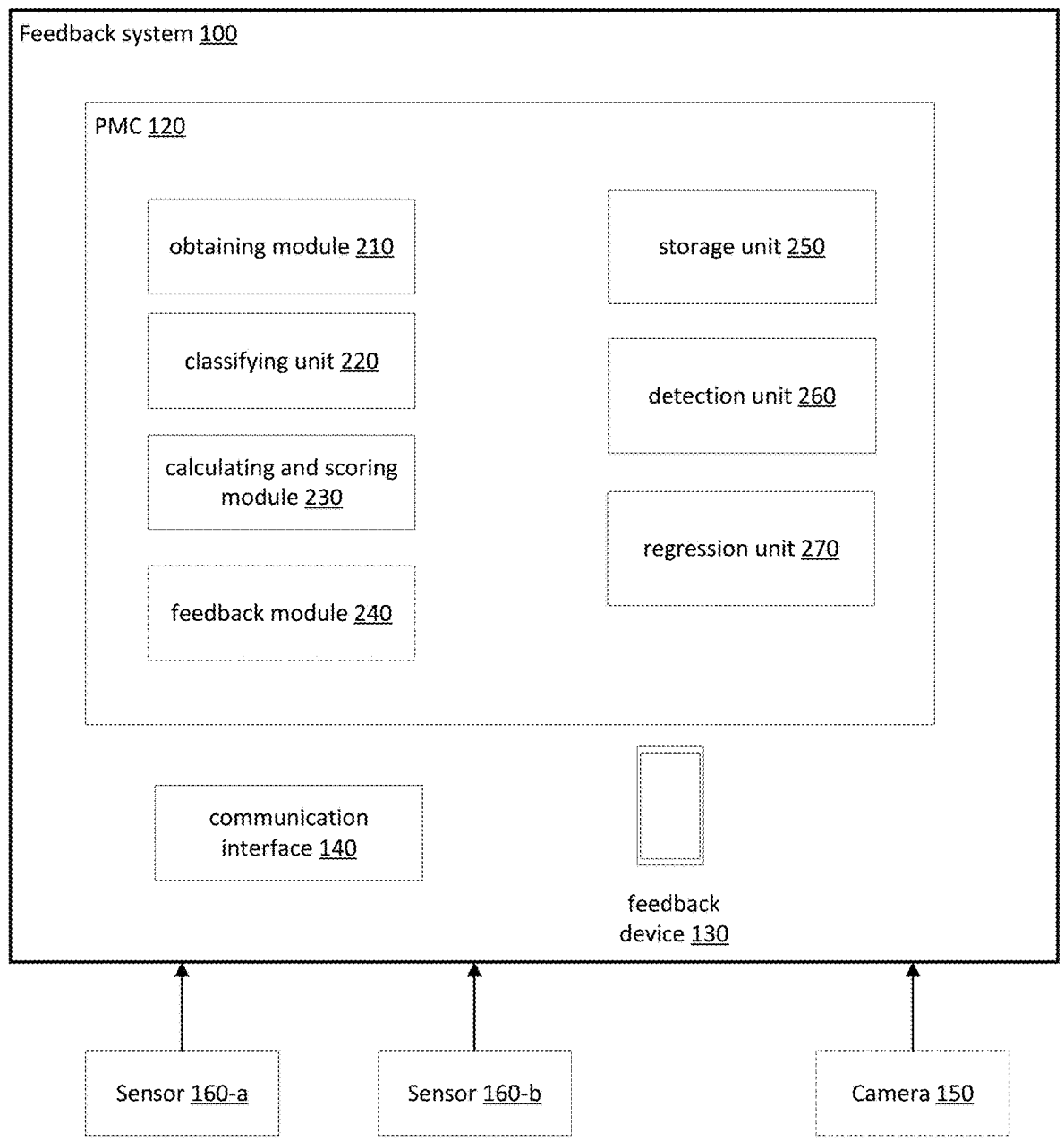
FIG. 2 illustrates a non-limiting block diagram of a feedback system 100 including a processor and memory circuitry (PMC) in accordance with certain embodiments of the presently disclosed subject matter.

Attention is now drawn to FIG. 2 illustrating a non-limiting block diagram of a feedback system 100 including PMC 120, in accordance with certain embodiments of the presently disclosed subject matter. The numeral references of elements of feedback environment as appearing in FIG. 1 are also applicable to FIG. 2.

Feedback system 100 includes PMC 120, communication interface 140 and feedback device 130, as illustrated in FIG. 1. As further detailed below, the processor of PMC 120 is configured to execute several functional modules in accordance with computer-readable instructions implemented on a non-transitory computer-readable storage medium. Such functional modules are referred to hereinafter as comprised in the processor. The processor can comprise an obtaining module 210, a classifying unit 220, a calculating and scoring module 230, a feedback module 240, a storage unit 250, a detection unit 260 and a regression unit 270.

In some examples, user 110 wishes to perform a target motion of a landed hook. User 110 can select a designated target motion in feedback system 100, e.g. by selecting one option of several displayed options on feedback device 130. The displayed options can be pre-defined by feedback system and retrieved from storage unit 250. Alternatively, the designated target motion could be preconfigured and announced to the user before motion execution. The selected motion can be communicated to PMC 120, thus PMC 120 is configured to obtain data on the designated motion.

As described in FIG. 1, once the user 110 performs an action, sensors 160 are configured to sense motion data from the user 110. PMC 120 is configured to obtain the motion data indicative of the motion of the user 110, e.g. by obtaining module 210 through communication interface 140. In examples where the feedback environment (illustrated in FIG. 1) includes additional sensors, obtaining module 210 is configured to obtain motion data by receiving additional motion data from one or more additional sensors, e.g. through communication interface 140. For example, camera 150 is configured to sense the additional motion data by capturing a video of user 110, or a pressure mat (not shown) is configured to sense pressure of the user 110. A person versed in the art would realize that other sensors configured to provide motion data are applicable to the disclosed subject matter, such as radars, LIDARS, microphones, infrared or depth cameras, force sensors, tension sensors and the motion data can be extracted using sophisticated yet well-known algorithms (e.g. for extracting motion data from a video captured by camera 150, a pre-trained pose recognition model or image segmentation algorithms must be run).

Once the motion data is obtained, the motion data is processed by PMC 120 for providing a total quality score with respect to the motion. The processing includes processing of the motion data in one or more trained models. The models can include detection model for detecting the fact of motion happening/performed by a user, as processed by detection unit 260, classification model to predict class of a specific motion, e.g. punch type, as processed by classifying unit 220 and regression model to estimate numeric characteristics of the motion, such as punch speed or force of impact, as processed by regression unit 270. Each of the models outputs one or more scores. These models are further explained in relation to FIG. 3 below.

One or more scores of the models constitute a set of subscores in relation to the designated target motion. Based on the determined set of subscores, calculating and scoring module 230 is configured to provide a total quality score with respect to the designated target motion of the user, e.g., by applying calculation on the subscores for obtaining a consolidated total quality score. For example, a weighted average of some or all subscores can be calculated. The calculation and utilization of the set of subscores for obtaining a total quality score is further described below with respect to FIG. 3. The total quality score is indicative of an overall correctness of the motion performed by the user in relation to the designated target motion. Calculating and scoring module 230 is configured to provide the total quality score to feedback module 240 comprised in PMC 120. In turn, feedback module 240 is configured to provide the total quality score to the user, e.g. by displaying it on the feedback device, e.g. using feedback device 130.

In some examples, feedback module 240 is configured to provide, alternatively or in addition to the total quality score, focused feedback on the motion of the user. The focused feedback is feedback that focuses on one or more specific aspects or characteristics of the motion, rather than providing general feedback or score on the motion and includes feedback in relation to one or more subscores from among the set of subscores. For example, the focused feedback can relate to the speed characteristics score. The focused feedback can include guidance on the desired improved speed of the motion performed. Further details of possible feedbacks are described below in relation to FIG. 4. Feedback module 240 is configured to provide the focused feedback e.g. by communicating the feedback to feedback device 130. Feedback device 130 can then provide feedback to the user 110, e.g. by displaying the feedback.

Any of the above scores, calculations, measurements etc. can be stored, e.g. in storage unit 250 and can be used as a basis for analytics, such as providing the user with progressive feedback on his progress, performing statistics on users, etc.

It is noted that the teachings of the presently disclosed subject matter are not bound by the feedback environment and system described with reference to FIGS. 1 and 2. Equivalent and/or modified functionality can be consolidated or divided in another manner and can be implemented in any appropriate combination of software with firmware and/or hardware and executed on a suitable device. For example, feedback device 130 can comprise either or all of PMC 120, communication interface 140 and camera 150 and perform their functionality. Also, those skilled in the art will also readily appreciate that the data repositories such as storage unit 250, and as illustrated by an example in FIG. 5 below, can be consolidated or divided in other manners; databases can be shared with other systems or be provided by other systems, including remote third-party equipment.

Figure 3:
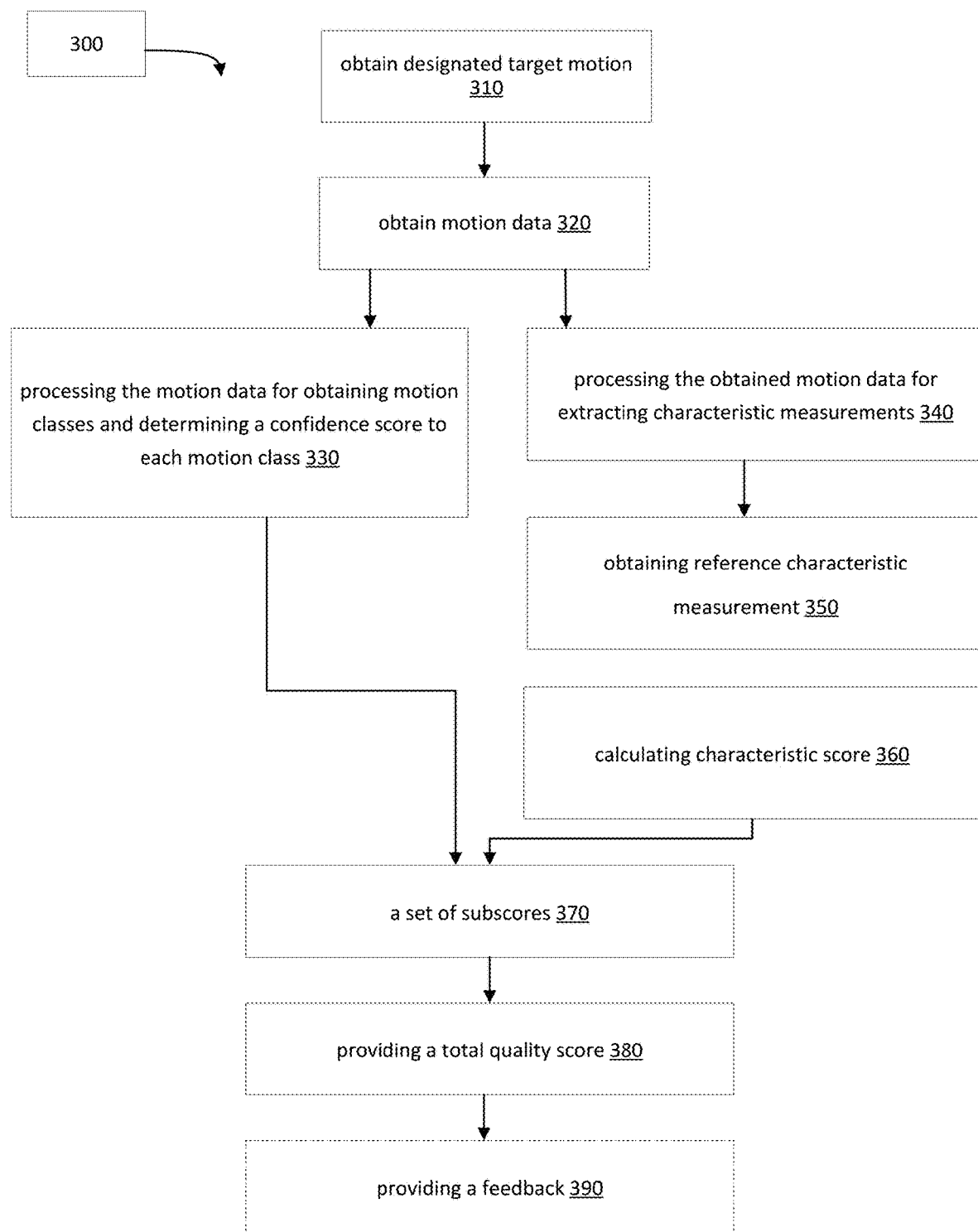
FIG. 3 illustrates a generalized flow-chart of operations carried out by a PMC in accordance with certain embodiments of the presently disclosed subject matter.

Referring to FIG. 3, there is illustrated a flow chart of operations carried out by PMC 120, in accordance with certain embodiments of the presently disclosed subject matter.

As described, PMC 120 provides a total quality score with respect to a motion of a user, for example, when the target motion is a landed hook. In some examples, PMC 120 obtains data indicative of the designated target motion (block 310). In some examples, the user 110 selects a motion that he wishes to perform. After the selection, PMC 120 obtains data indicative of the designated target motion by receiving the selection. Alternatively, the designated target motion is preconfigured and announced to the user 110 before motion execution, thus PMC 120 obtains data indicative of the designated target motion by receiving the preconfigured target motion.

For example, PMC 120 obtains information on the selection of the user 110, Before or after selecting the target motion of a landed hook, user 110 performs a motion. One or more sensors 160 that are operatively connected to user 110 sense motion data. For example, sensors 160 can be IMUs on the wrists of the user 110. The sensed data is obtained by PMC 120 (block 320), e.g. by receiving it from sensors 160 through communication interface 140. In examples where the feedback environment includes additional sensors that sense additional motion data of the motion performed by the user 110, PMC 120 obtains additional motion data by receiving motion data from one or more additional sensors. For example, camera 150 senses the additional motion data by capturing a video of user 110, or a pressure mat (not shown) senses pressure of the user 110. The obtained motion data is indicative of a motion of the user 110. For example, the speed sensed by IMU sensor is indicative of the speed of the motion performed by the user 110. A moving video of a skeleton of user 110 extracted from the video captured by camera 150 using known methods, is indicative of a movement, and hence a motion, performed by the user 110, A person versed in the art would appreciate that other examples of sensors providing motion data are also applicable to the disclosed subject matter, for example, skeleton data to provide motion data on freeze motion.

PMC 120 then processes the obtained motion data for providing a total quality score with respect to the designated target motion. As explained above, the processing includes processing of the motion data in one or more trained models to obtain data indicative of correctness of one or more aspects of the motion of the user in relation to the target motion. The models can include a detection model for detecting the fact of motion happening/performed by a user, a classification model to predict class of a specific motion, e.g. punch type, and regression models to estimate numeric characteristics of the motion, such as punch speed or force of impact. Each of the models outputs one or more scores. In some examples, storage unit 250 stores the trained models and PMC 120 obtains the trained models from storage unit 250, The above models will now be explained in relation to the fighting motion example, in which the user wishes to perform a designated target motion of a landed hook punch. However, the specific examples of models should not be considered as limiting and a person versed in the art would appreciate that other models and classes of the models, can be applied with respect to other types of motions.

In some examples, processing the obtained motion data in the models can be done e.g. by detection unit 260, classifying unit 220 and regression unit 270, comprised in PMC 120, while assisting calculating and scoring module 230.

At block 330, PMC 120, e.g. using detection unit 260 and classifying unit 220 comprised in PMC 120, processes the motion data in the classification model, for obtaining at least one motion class and determines a confidence score to each of the at least one motion class, wherein at least one motion class is associated with the designated target motion. In order to do so, detection unit 260 classifies the motion data to a motion performed class and a non-motion performed class and classifying unit 220 classifies the motion data include several classes, each relating to a certain type of punch and may include e.g. hook class, jab class, cross class or uppercut class. Additional impact type classes can also be included, e.g. to classify whether the user missed or hit a target. Such classes include a landed motion class and a missed motion class. Classifying the motion data to one or more classes can be done e.g. using known ML mechanisms, Neuronal networks, Decision Tree based algorithms, Support Vector Machines and other known classifiers. The classification model is pre-trained using data for motion examples obtained from expert users (also to be referred to throughout the description as "professionals in the field"). Using pre-trained classification model for classifying the motion data into one or more classes is advantageous compared to using a single motion template of a target motion for several reasons. First, the approach relying on a single motion template of a target motion, e.g. when one professional in the field performs the target motion, fails to account various variations of the target motion that are considered acceptable in the field. On the other hand, by using a pre-trained classification model, the model explicitly represents various acceptable variations of the target motion by collecting and processing in advance representative set of example motions and measurements of the motion, performed by professionals in the field instead of relying on a single template motion. Comparing to a set of measurements, as explained below, rather than to a "perfect template" of a motion avoids the need of known systems, to create a perfect template. In addition, in known systems, since the motion of the user is compared to a perfect template motion performed by a single professional in the field, the feedback to the user may include feedback to aspects of the target motion, which may be acceptable in the field. On the other hand, when providing feedback based on a pre-trained model, as described below, the focused feedback that is provided to the user already considers the acceptable variations to the target motion performed by several professionals in the field.

Classifying the motion data using pre-trained models results in an output value for each class. In some examples, it is possible, using known classification algorithms, to output confidences between 0 and 1 for each possible class, where the sum of all the confidence scores for a given motion is 1. In such cases, the output value of each class is the confidence score for each class. If an algorithm returns unbounded positive output values for each class, the output values can be converted by dividing each value by the sum of all values for a given motion or using softmax function, resulting in confidence score for each class, where the sum of all confidence scores is 1. Alternatively or additionally, well-known normalization techniques can be applied to convert output values to proper probabilities, each probability constitutes the confidence score of the class.

One or more confidence scores constitute a subscore in a set of subscores in relation to the designated target motion. Each subscore corresponding to a given aspect of the motion. Consider the example of user 110 performing a designated motion target being a landed hook punch. Processing the motion data in the detection and classification models can result in the following confidence scores for each class:

Motion detection classes:
motion performed class: 0.9
non-motion performed class: 0.1
Punch type classes, as processed in the classification model:
hook class: 0.5
a jab class: 0.1
cross class: 0.3
uppercut class: 0.1
Impact type classes, as processed in the classification model:
landed motion class: 0.3
missed motion class: 0.7

As noted, at least one of the motion classes is indicative of the designated target motion of the user. In the above example, three classes are indicative of the target motion of a landed hook namely: "motion performed class", "hook punch class" and "landed motion class". Each confidence score of these three classes will be a subscore in the set of subscores and corresponds to a given aspect of the motion.

The confidence score of 0.9 for motion performed class is indicative of a high likelihood that a motion was indeed performed. The confidence score of 0.3 for landed motion punch class, as illustrated above, is indicative of low correctness of the "landed" aspect of landed hook motion, and the confidence score of 0.5 for hook motion punch class, is indicative of average correctness of the "hook" aspect of landed hook motion.

As mentioned above, the models are illustrated by way of a non-limiting example in the field of fighting motions. A person versed in the art would appreciate that other models and classes of the models, can be applied with respect to other types of motions. An example of a dance motion includes step class, turn class, hand swing class, clap class etc. Other examples of motions and classes of the motions include bat/racket/hockey stick swings motions, kicks motions and ball kicks motions.

Simultaneously or sequentially to the above process, regression unit 270 processes the obtained motion data using a regression model, for extracting at least one characteristic measurement, such measurements including a punch speed or force of impact of the punch (block 340).

In the example of a punch motion, characteristics of a punch motion can include speed, force, first acceleration, reaction time etc. In some examples, sensors 160-a and 160-b are IMU sensors on the wrists of the user 110. Once the user 110 performs a motion, e.g. a punch, IMU sensors 160-a and 160-b sense one or more characteristic measurement such as acceleration and angular velocity of the wrist. Then using pre-trained regression model for speed and force of impact (or potential impact) can be estimated. For example, based on the motion data from the sensors 160-a, regression models produces the following characteristic measurement the right hand:

Speed: 5 meters per second;
Force: 1500 Newton;

Before or after extracting the characteristic measurements from the obtained motion data, regression unit 270 obtains reference characteristic measurement (block 350).

In some examples, in order to determine a characteristic score for each characteristic for a specific target motion, PMC 120 obtains reference characteristic measurements, i.e. measurements of one or more characteristics of the target motion that were measured by sensors 160 when the target motion was performed by professionals in the field. At least one of the reference characteristic measurements corresponds to at least one of the extracted characteristic measurements, respectively, to make sure that if speed was measured or estimated based on sensed data, corresponding reference speed measurements will be obtained. The reference characteristic measurements of the target motion can be stored e.g. at storage unit 250 and can be obtained by PMC 120 e.g. by retrieving one or more measurements from the storage unit 250. Retrieving one or more measurements is further described below in FIG. 5.

PMC 120 then evaluates the extracted measurements of characteristics in the obtained motion data to the reference characteristic measurements retrieved from storage unit 250 and calculates at least one characteristic score, each based on one of the extracted characteristic measurements and the corresponding obtained reference characteristic measurements (block 360). For example, the characteristic score is a value between 0 and 1 calculated using domain and feature specific heuristics on the extracted characteristic measurements and the reference characteristic measurements. One example of such heuristics is using a percentile of the extracted characteristic within reference characteristics measurements of the professionals.

Figure 5:
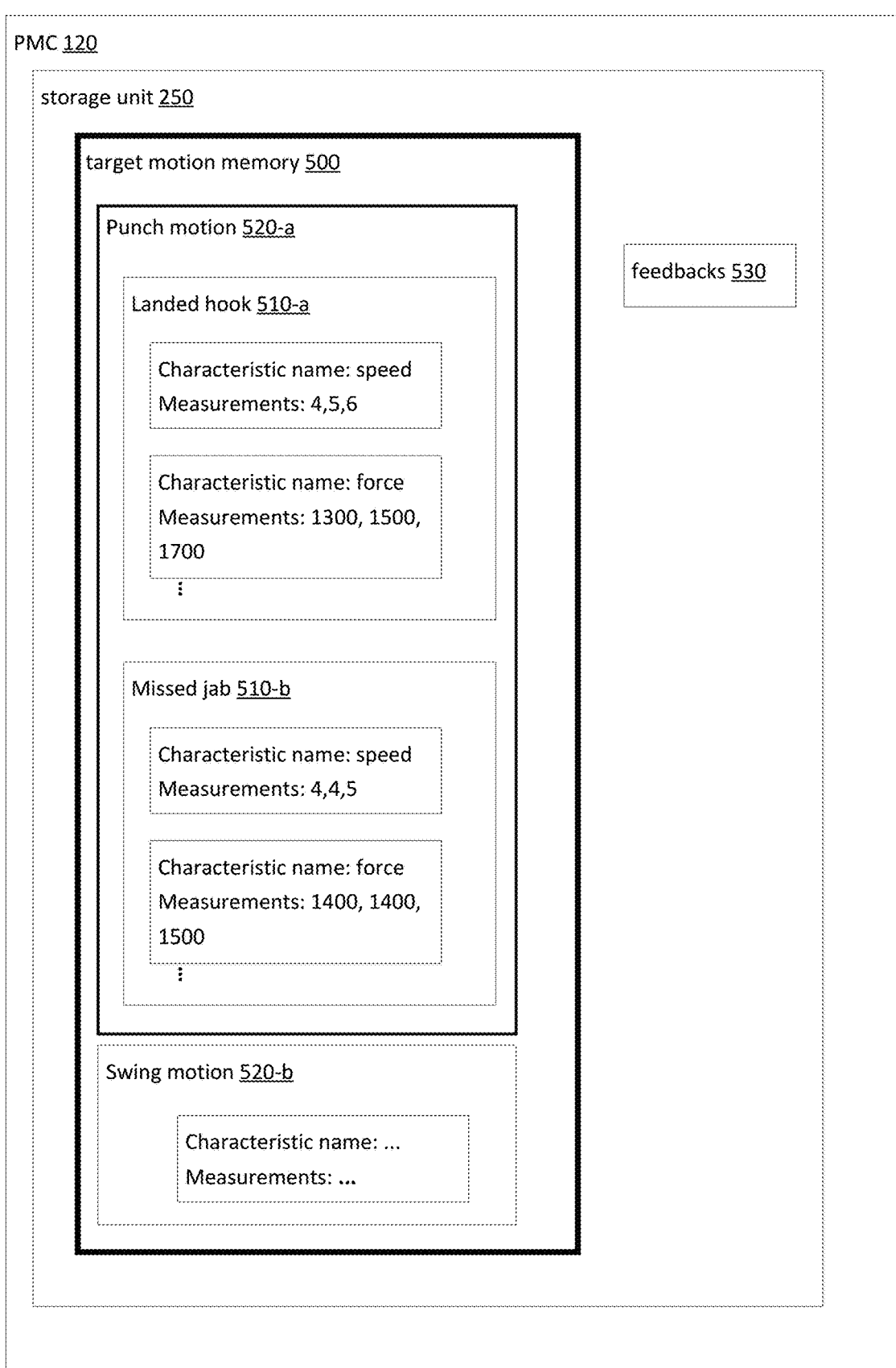
FIG. 5 illustrates one example of a storage unit comprising target motion memory in accordance with certain embodiments of the presently disclosed subject matter.

Reference is now made to FIG. 5 illustrating a non-limiting example of PMC 120 including a database of storing a reference characteristic measurement of professionals, and how to calculate at least one characteristic score, based on the extracted characteristic measurement and the corresponding obtained reference characteristic measurement. As illustrated in FIG. 5, storage unit 250, which is comprised in PMC 120, comprises a target motion memory 500. Memory 500 comprises one or more groups of motions types 520. FIG. 5 illustrates two motion type groups: punch motion 520-*a* e.g. in boxing, and swing motion 520-*b* e.g. in golf. Each of the groups can include one or more target motions 510. Swing motion type 520-*b* can include target motions of back-swing, downswing, or upswing (not shown). Punch motion type 520-*a* includes two target motions: a landed hook 510-*a* and missed jab 510-*b*. Each target motion 510 includes one or more reference characteristic measurements identified by a characteristics name. Each reference characteristic measurement is associated with a list comprising one or more measurements. In some examples the reference characteristic measurements of the target motions are different from one target motion to another. As such, the specific target motion of a landed hook has certain characteristics which may not be relevant for other target motions, such as the upswing target motion in swing motion 520-*b* or a kick target motion (now shown). The measurements for each characteristic comprise a list of measurements, where each measurement in the list of measurement indicates a measurement of a characteristic when a professional performed the target motion. In some examples, one or more professionals perform a target motion, and sensors associated with the professionals sense motion data. The motion data include data relating to measurement of one or more characteristics. The sensed measurements with the associated characteristics are then stored in memory 500.

For example, target motion landed hook 510-*a* includes two characteristics: characteristic name: "speed" and its associated measurements and characteristic name: "force" and its associated measurements. The measurements of speed include a list of measurements measured in meters per second (m/s): 4 m/s, 5 m/s, and 6 m/s. Each measurement indicates a measurement of speed of a professional performing a landed hook. As such, 4 m/s was taken by professional 1.5 m/s was taken by professional 2 and 6 m/s was taken by professional 3. Alternatively, one or more of the measurements were taken by the same professional on different occasions of performing a landed hook.

Memory 500 includes another target motion of missed jab 510-*b*. Missed jab also includes the following characteristics: characteristic name: "speed" and its associated measurements and characteristic name: "force" and its associated measurements.

It should be noted that at least some characteristics of each target motions are different from one target motion to another, irrespective of whether the target motions are of the same type of motion. As such, the characteristics of missed jab 510-*b* may be different to those of landed hook 510-*a*, and that the measurements of speed of target motion of missed jab 510-*b* are different to the measurements of speed of target motion of landed hook 510-*a*, as the "optimal" speed, e.g. the speed performed by a professional, of each motion can be different. Also, some characteristics of a certain target motion may not be relevant for another target motion.

A person versed in the art would appreciate that memory 500 and its structure is a specific example, and the data may be stored in a different manner. For example, the memory 500 can store records data indicative of professionals and their respected characteristics for each target motion instead of a list of measurements for each characteristic as illustrated in FIG. 5. Other forms of obtaining the measurements of characteristics of professionals can be used for the purpose of the described subject matter.

Referring back to FIG. 3, once reference characteristic measurements are obtained from memory 500, PMC 120 calculates at least one characteristic score. Each characteristic score is based on one of the characteristic measurements extracted from the obtained motion data, and the corresponding obtained reference characteristic measurements obtained from memory 500.

Calculating the characteristic score is done using domain and feature specific heuristics. For the case when higher values of measurement are preferable (for example, the higher the punch force the better) one example of such heuristics is using a percentile of the extracted characteristic measurement within the corresponding obtained reference characteristic measurement. The characteristic score can be a value between 0 and 1.

Below is a non-limiting example of calculating characteristics scores for characteristics of a landed hook designated target motion. Considering the landed hook, the characteristics can be:

1. Speed
2. Force

The measurements of the above characteristics as extracted from the motion data sensed by sensors 160 associated with the user 110, and obtained by PMC 120 are:

Speed: 4.8 m/s
Force: 1600 Newton

For each characteristic measurement or a group of several characteristic measurements, calculating and scoring module 230 calculates a characteristic score. Hence, calculating and scoring module 230 obtains from memory 500 at least one reference characteristic measurement relating to landed hook 510-*a*, e.g. the list of measurements associated with speed and the list of measurements associated with force:

Speed (m/s): 4, 5, 6
Force (Newton): 1300, 1500, 1700

Using e.g. a percentile of the extracted characteristic measurements within the characteristic measurements of professionals obtained from memory 500, calculating and scoring module 230 calculates the characteristic score based on the following stages and data:

User's speed in motion (extracted from motion data): 4.8 m/s
Professional's speed in motion (obtained from memory 500): 4, 5, 6 m/s
Calculating a percentile of 4.8 m/s of 4, 5, 6 m/s results in 0.33,
This value is then used as a speed score: 0.33.

A similar calculation can be done with respect to the force characteristic, based on the force obtained in user's motion and professional's force from memory 500, to obtain a force score of 0.67.

These characteristic scores, are each based on one of the extracted characteristic measurements and the corresponding obtained reference characteristic measurements. The characteristic scores are calculated with respect to the designated target motion of a landed hook performed by the user.

It is to be noted that certain measured characteristics can result in a high score when considering a target motion of a first type, and a low score when considering a target motion of a second type.

In some examples, one or more of the confidence scores from the detection model and the classification model, and one or more of the characteristic scores from the regression model may constitute a subscore in a set of subscores. This means that processing the motion data in the models is done so as to obtain a set of subscores that is composed of at least the determined at least one confidence scores and the determined at least one characteristic score (block 370). In some examples, the confidence scores and characteristic scores relating to target motion constitutes subscores in the set of subscores.

Considering for example, that the models output the following confidence scores and characteristic scores with respect to the landed hook target motion. Some of the confidence scores and characteristic scores constitute subscores in the set of subscores motion performed class: 0.9 (this confidence score constitutes a subscore in the set of subscores)

non-motion performed class: 0.1 hook class: 0.5 (this confidence score constitutes a subscore in the set of subscores as a punch type score, since the target motion was a hook)

a jab class: 0.1 cross class: 0.3 uppercut class: 0.1 landed class: 0.7 (this confidence score constitutes a subscore in the set of subscores as a punch impact type score, since the target motion was a landed)

missed class: 0.3 speed characteristic score: 0.5 (this characteristic score constitutes a subscore in the set of subscores)

force characteristic score: 0.2 (this characteristic score constitutes a subscore in the set of subscores)

Based on the set of subscores, calculating and scoring module 230 provides a total quality score for the motion of the user with respect to the designated target motion, based on the set of subscores, wherein the total quality score is indicative of correctness of the motion of the user with respect to the designated target motion (block 380). Providing a total quality score can be done e.g. by performing calculation on the subscore to obtain a consolidated score. For example, calculation may include conducting a weighted average of some or all subscores. Another example could be calculating the product of some or all the subscores. The total quality score is indicative of correctness of the motion of the user with respect to the designated target motion. In the above example, exemplary equal weights given to each subscore in the set of subscores, result in a 0.56 as a total quality score for the motion performed by the user.

Calculating and scoring module 230 is configured to provide the total quality score to feedback module 240 comprised in PMC 120. In turn, feedback module 240 provides the total quality score to the user (block 390), e.g. by displaying it on the feedback device, with or without the set of subscores.

Attention is now drawn FIG. 4, illustrating a flow chart of operations carried out by feedback module 240, in accordance with certain embodiments of the presently disclosed subject matter.

In some examples, feedback module 240 is configured to provide, alternatively or in addition to the total quality score focused feedback on the motion of the user. The focused feedback can be in relation to one or more subscores from among the set of subscores. For example, the feedback can relate to the speed characteristic subscore. In some examples, one or more predefined feedbacks are assigned to a low value of each subscore. the feedback itself can include a guidance on if and how to improve the speed of the motion performed. Feedback module 240 provides the feedback e.g. by communicating the feedback to feedback device 130. Feedback device 130 then provides the feedback to the user 110, e.g. by displaying the feedback.

In some examples, in order to provide a user with feedback on the motion performed by him, such that the feedback assists the user to better perform the designated target motion, it is advantageous to provide the user with focused feedback. Focused feedback is feedback that focuses on one or more specific aspects or characteristics of the motion, rather than providing general feedback or a score on the motion and includes feedback in relation to one or more subscores from among the set of subscores. Focused feedback on a specific aspect may assist the user 110 to focus on improving a specific aspect of the motion, thus resulting in a better possibility of performing the motion from then onwards. For example, focused feedback can feedback on the speed characteristic score of the landed hook performed by the user 110. Upon receipt of the feedback on the speed, the user 110 can focus on improving his speed in the next motion, thus resulting in a better possibility of performing the motion the next time, when the user 110 focuses on the speed. Assume, for example, that no consideration is being made with respect to which aspect of the motion to give feedback on, user 110 can receive feedback on an aspect which compared to others is performed with a high accuracy, yet is not perfect, instead of receiving feedback on another aspect which is performed with low accuracy. Providing feedback without any consideration on which aspect would bring the highest improvement in performance of the motion, in most cases may result in slow progress of performing the motion, as the user may be focusing on an aspect which is relatively performed with high accuracy and the room for improvement in that particular aspect is low. In order to provide focused feedback, it is advantageous to identify which aspect of the motion feedback will be provided. In addition, it is advantageous to provide guiding feedback on the specific aspect that was identified and selected to provide such feedback.

In some examples, based on the set of subscores, with respect to each of the at least two subscores of the set of subscores, feedback module 240 manipulates a subscore, giving rise to a manipulated subscore (block 410). For example, manipulating the subscore includes modifying the subscore to a maximal possible score. Considering the example of a landed hook motion with one subscore of the set of subscores being speed subscore—0.33, manipulating the subscore includes modifying the speed subscore to a value of 1.

After manipulating one of the values of subscores, a new set of manipulated subscores is provided (similar to block 370 in FIG. 3), wherein one of the subscores is manipulated. Similar to the calculation done based on the original and non-manipulated subscore (block 380 in FIG. 3), feedback module 240 calculates a resulting manipulated total quality score with respect to the target motion of the user, based on the manipulated subscore, instead of the non-manipulated subscore (block 420). Calculating a manipulated total quality score can be done, e.g. using calculating and scoring module 230.

Feedback module 240 then selects a resulting manipulated total quality score that meets an improvement criterion compared to resulting manipulated total quality scores that are obtained in response to manipulating other non-selected subscores from among the set of subscores (block 430). For example, the improvement criterion is the resulting manipulated total quality score being the highest score.

In some examples, one or more feedbacks are created and stored e.g. in feedbacks 530 in storage unit 250 illustrated in FIG. 2, where each feedback includes one or more statements with respect to a low score of one of the subscores.

Once a resulting manipulated total quality score is selected, feedback module 240 selects feedback that pertains to the subscore that is associated with the selected resulting manipulated total quality score and provides the feedback to the user 110. For example, if the resulting manipulated total quality score is based on the manipulated set of subscores, where the speed score was manipulated, then feedback that includes one or more statements on the speed of the motion is selected and provided to the user, with respect to the target motion that was performed by him.

Below is an example of providing feedback to the user.

Returning to the example above of the set of subscores comprising the following subscores:

| Class/characteristic name | Subscore |
|---|---|
| motion performed | 0.9 |
| Punch type score | 0.5 |
| Punch impact score (landed class) | 0.7 |
| Speed score | 0.5 |
| Force score | 0.2 |
| Total quality score | 0.56 |

Given equal weights to each subscore in the set of subscores the total quality score was calculated as above.

In order to select a subscore to provide respective feedback thereon, each subscore is manipulated (referenced as "Man." In the table below), and a new manipulated total quality score is provided. The table below illustrates each manipulation on one subscore.

| Class/characteristic name | Man. Punch subscore | Man. punch type subscore | Man. punch impact subscore | Man. speed subscore | Man. force subscore |
|---|---|---|---|---|---|
| motion performed | 1 | 0.9 | 0.9 | 0.9 | 0.9 |
| Punch type score | 0.5 | 1 | 0.5 | 0.5 | 0.5 |
| Punch impact score | 0.7 | 0.7 | 1 | 0.7 | 0.7 |
| Speed score | 0.5 | 0.5 | 0.5 | 1 | 0.5 |
| Force score | 0.2 | 0.2 | 0.2 | 0.2 | 1 |
| Total Man. quality score | 0.58 | 0.66 | 0.62 | 0.66 | 0.72 |

Upon reviewing the manipulated total quality scores resulting from a manipulation on one of the subscores, it is illustrated that the highest manipulated total quality scores resulted from manipulation on force subscore. In such a case, PMC 120 identifies and selects this characteristic on which to provide feedback. Assuming a force subscore is selected, feedback corresponding to a low value of force is retrieved from feedback 530 in PMC 120 and is provided to the user. For example, the feedback can include the following statement: "Rotate your hips and shoulders in order to add force to your punch".

If the manipulated scores are equal for several aspects of the motion one can pick the feedback randomly out of the corresponding feedback subset. Alternatively, predefined default order could be used as a fallback in this case.

In some examples, for subscores based on the classification models the confidences for the classes other than the one of target motion can be used for feedback generation as well. For example, assume the target motion is a landed hook and punch type classification model returns the following class confidences for a given motion:

Jab: 0.4
Cross: 0.05
Hook: 0.5
Uppercut: 0.05

In this case feedback highlighting the difference between the jab and hook motions could be given as confidence for jab is the highest out of the classes other than target punch type. Example of such feedback can be "Hook is a power punch, the first should travel in an arc, not straight".

A person versed in the art would appreciate that the above example is based on manipulation on one subscore, and that manipulation can be done on more than one subscore, or a combination of subscores. Alternatively or additionally, the manipulated total quality scores can be sorted, and one or more corresponding feedbacks can be displayed to the user 110, in a corresponding sorted manner, optionally, in decreasing ranking of importance.

It is noted that the teachings of the presently disclosed subject matter are not bound by the flow chart illustrated in FIGS. 3 and 4, and that the illustrated operations can occur out of the illustrated order. For example, operation 340 and 350, or operation 310 and 320 shown in succession can be executed substantially concurrently or in the reverse order. It is also noted that whilst the flow chart is described with reference to elements of feedback system 100 and memory 500, this is by no means binding, and the operations can be performed by elements other than those described herein or with a different structure of memory 500.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A computerized method for scoring a motion of a user, comprising, by a processor and memory circuitry:
   obtaining motion data, the motion data being indicative of a motion of a user;
   obtaining data indicative of a designated target motion;
   using a trained machine learning model to process the motion data, wherein the trained machine learning model enables obtaining at least one motion class, and determining a confidence score to each motion class respectively, wherein at least one motion class is associated with the designated target motion;

processing the obtained motion data for extracting at least one characteristic measurement;

obtaining a plurality of reference characteristic measurements, that relate to the at least one motion class, wherein at least one of the reference characteristic measurements corresponds to at least one of the extracted characteristic measurements, respectively;

calculating at least one characteristic score, based on one of the extracted characteristic measurements and the corresponding obtained reference characteristic measurements;

so as to obtain a set of subscores that is composed of at least the determined at least one confidence score and the determined at least one characteristic score; and providing a total quality score for the motion of the user with respect to the designated target motion, based on the set of subscores, wherein the total quality score is indicative of correctness of the motion of the user with respect to the designated target motion.

2. The computerized method of claim 1, further comprising:

providing feedback with respect to a selected subscore from among the set of subscores.

3. The computerized method of claim 2, wherein the subscore is selected, including:

in response to manipulating a subscore, a resulting manipulated total quality score meets an improvement criterion compared to resulting manipulated total quality scores that are obtained in response to manipulating other non-selected subscores from the set of subscores.

4. The computerized method of claim 3, wherein, the total quality score constitutes a non-manipulated total quality score, and wherein providing the feedback includes performing with respect to each of the at least two subscores of the set of subscores:

manipulating one of the subscores, giving rise to a manipulated subscore;

calculating a resulting manipulated total quality score with respect to the target motion of the user, based on the manipulated subscore instead of the non-manipulated subscore;

selecting a resulting manipulated total quality score that meets the improvement criterion; and providing the feedback with respect to the target motion of the user that pertains to the subscore that is associated with the selected resulting manipulated total quality score.

5. The computerized method of claim 4, wherein the improvement criterion includes the resulting manipulated total quality score being the highest score.

6. The computerized method of claim 5, wherein the manipulating one of the subscores includes modifying the subscore to a maximal possible score.

7. The computerized method of claim 1, wherein the obtaining motion data comprises at least receiving motion data from one or more sensors operatively connected to the user.

8. A system for providing a total score on a motion of a user, comprising:

one or more sensors operatively connected to the user;

a processing and memory circuitry (PMC) operatively connected to the one or more sensors, wherein:

the one or more sensors are configured to sense motion data, the motion data being indicative of a motion of a user;

the PMC is configured to:

obtain motion data, the motion data is indicative of a motion of a user;

obtain data indicative of a designated target motion;

using a trained machine learning model to process the motion data for obtaining at least one motion class, and determining a confidence score to each motion class respectively, wherein at least one motion class is associated with the designated target motion;

process the obtained motion data for extracting at least one characteristic measurement;

obtain a plurality of reference characteristic measurements, that relate to the at least one motion class, wherein at least one of the reference characteristic measurements corresponds to at least one of the extracted characteristic measurements, respectively;

calculate at least one characteristic score, each based on one of the extracted characteristic measurement and the corresponding obtained reference characteristic measurements;

so as to obtain a set of subscores that is composed of at least the determined at least one confidence score and the determined at least one characteristic scores; and provide a total quality score for the motion of the user with respect to the designated target motion, based on the set of subscores, wherein the total quality score is indicative of correctness of the motion of the user with respect to the designated target motion.

9. The system of claim 8, the PMC is further configured to:

provide feedback with respect to a selected subscore from among the set of subscores.

10. The system of claim 9, wherein the subscore is selected, including:

in response to manipulating a subscore, a resulting manipulated total quality score meets improvement criterion compared to resulting manipulated total quality scores that are obtained in response to manipulating other non-selected subscores from the set of subscores.

11. The system of claim 10, wherein, the total quality score constitutes a non-manipulated total quality score, and wherein the PMC is configured to perform with respect to each of the at least two subscores of the set of subscores:

manipulate one of the subscores, giving rise to a manipulated subscore;

calculate a resulting manipulated total quality score with respect to the target motion of the user, based on the manipulated subscore instead of the non-manipulated subscore;

select a resulting manipulated total quality score that meets the improvement criterion; and provide the feedback with respect to the target motion of the user that pertains to the subscore that is associated with the selected resulting manipulated total quality score.

12. The system of claim 11, wherein the improvement criterion includes the resulting manipulated total quality score being the highest score.

13. The system of claim 12, wherein the PMC configured to manipulate one of the subscores, includes the PMC configured to modify the subscore to a maximal possible score.

14. A non-transitory computer readable storage medium tangibly embodying a program of instructions that, when executed by a computer, cause the computer to perform a method for scoring a motion of a user, the method comprising:

obtaining motion data, the motion data being indicative of a motion of a user;

obtaining data indicative of a designated target motion;

using a trained machine learning model to process the motion data, wherein the trained machine learning model enables obtaining at least one motion class, and determining a confidence score for each motion class respectively, wherein at least one motion class is associated with the designated target motion;

processing the obtained motion data for extracting at least one characteristic measurement;

obtaining a plurality of reference characteristic measurements, that relate to the at least one motion class, wherein at least one of the reference characteristic measurements corresponds to at least one of the extracted characteristic measurements, respectively;

calculating at least one characteristic score, each based on one of the extracted characteristic measurements and the corresponding obtained reference characteristic measurements;

so as to obtain a set of subscores that is composed of at least the determined at least one confidence score and the determined at least one characteristic scores; and providing a total quality score for the motion of the user with respect to the designated target motion, based on the set of subscores, wherein the total quality score is indicative of correctness of the motion of the user with respect to the designated target motion.

\* \* \* \* \*